(12) United States Patent
Hodson et al.

(10) Patent No.: US 8,776,088 B2
(45) Date of Patent: Jul. 8, 2014

(54) OPERATING SYSTEM DISTRIBUTED OVER HETEROGENEOUS PLATFORMS

(75) Inventors: Orion T. Hodson, Cambridgeshire (GB); Galen C. Hunt, Bellevue, WA (US); Edmund B. Nightingale, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 940 days.

(21) Appl. No.: 12/413,619

(22) Filed: Mar. 30, 2009

(65) Prior Publication Data
US 2010/0251265 A1 Sep. 30, 2010

(51) Int. Cl.
*G06F 3/00* (2006.01)
*G06F 15/16* (2006.01)

(52) U.S. Cl.
USPC ............ 719/319; 719/330; 719/312; 709/217

(58) Field of Classification Search
None
See application file for complete search history.

(56) References Cited

U.S. PATENT DOCUMENTS

| | | | |
|---|---|---|---|
| 6,732,153 B1 | 5/2004 | Jakobson et al. | |
| 6,961,806 B1* | 11/2005 | Agesen et al. | 711/6 |
| 7,020,814 B2 | 3/2006 | Ryle et al. | |
| 7,149,678 B2 | 12/2006 | Gurevich et al. | |
| 7,337,445 B1* | 2/2008 | Price et al. | 719/313 |
| 8,645,974 B2* | 2/2014 | Armstrong et al. | 719/321 |
| 2003/0195995 A1* | 10/2003 | Tabbara | 709/313 |
| 2006/0004779 A1* | 1/2006 | Rossiter et al. | 707/10 |
| 2006/0104295 A1 | 5/2006 | Worley et al. | |
| 2006/0112241 A1* | 5/2006 | Weiss et al. | 711/154 |
| 2006/0123424 A1 | 6/2006 | Hunt et al. | |
| 2007/0011272 A1* | 1/2007 | Bakke et al. | 709/217 |
| 2007/0083628 A1 | 4/2007 | Sandstrom | |
| 2008/0162873 A1* | 7/2008 | Zimmer et al. | 712/22 |
| 2008/0244507 A1 | 10/2008 | Hodson et al. | |
| 2008/0244599 A1 | 10/2008 | Hodson et al. | |
| 2008/0313655 A1* | 12/2008 | Pope et al. | 719/319 |
| 2010/0122264 A1* | 5/2010 | Xiaocheng et al. | 719/312 |

OTHER PUBLICATIONS

"Real-time Application Monitoring and Diagnosis for Service Hosting Platforms of Black Boxes", Liu, 2007, pp. 1-10.*
Hunt, et al., "Singularity: Rethinking the Software Stack," accessible at <<http://documents.scribd.com/docs/1gI87I86uf0csycyeh3e.pdf>>, 2007, 13 pages.
Guntensperger, Raphael, "A New Approach to Remote Object Communication," accessible at <<http://dotnet.sys-con.com/node/38825>>, 2003, 5 pages.

(Continued)

*Primary Examiner* — Tuan Dao
(74) *Attorney, Agent, or Firm* — Steve Wight; Carole Boelitz; Mickey Minhas

(57) ABSTRACT

An illustrative operating system distributes two or more instances of the operating system over heterogeneous platforms of a computing device. The instances of the operating system work together to provide single-kernel semantics to present a common operating system abstraction to application modules. The heterogeneous platforms may include co-processors that use different instruction set architectures and/or functionality, different NUMA domains, etc. Further, the operating system allows application modules to transparently access components using a local communication path and a remote communication path. Further, the operating system includes a policy manager module that determines the placement of components based on affinity values associated with interaction relations between components. The affinity values express the sensitivity of the interaction relations to a relative location of the components.

20 Claims, 13 Drawing Sheets

(56) References Cited

OTHER PUBLICATIONS

Chandrakanth, et al., "Design and Implementation of a Multi-Channel Multi-Interface Network," Proceedings of the 2nd International Workshop on Multi-hop Ad Hoc Networks: From Theory to Reality, accessible at <<http://www.crhc.uiuc.edu/wireless/papers/chereddi2006Realman.pdf>>, 2006, 8 pages.

"Palpable Computing: A New Perspective on Ambient Computing," IST-002057 PalCom, PalCom External Report #69, Deliverable 54 (2.2.3), accessible at <<http://64.233.183.104/search?q=cache:eTPad3IgdM4J:www.ist-palcom.org/publications/deliverables/Deliverable-54-%255B2.2.3%255D-open-architecture.pdf+communication+%22channel+abstraction%22+hardware&hl=en&ct=clnk&cd=55>>, accessed Nov. 2008, 202 pages.

Chapin, et al., "Hive: Fault Containment for Shared-Memory Multiprocessors," 15th ACM Symposium on Operating Systems Principles, Dec. 1995, accessible at <<http://www.coralcdn.org/05aucs240c/sched/readings/hive.pdf>>, 15 pages.

Fahndrich, et al., "Language Support for Fast and Reliable Message-based Communication in Singularity OS," Proceedings of the 1st Annual European Conference on Computer Systems, 2006, accessible at <<http://research.microsoft.com/users/maf/Papers/singsharp.pdf>>, 14 pages.

Gamsa, et al., "Tornado: Maximizing Locality and Concurrency in a Shared Memory Multiprocessor Operating System," Proceedings of the 3rd Symposium on Operating Systems Design and Implementation, (1999), accessible at <<http://www.cc.gatech.edu/classes/AY2005/cs6210_spring/papers/gamsa99tornado.pdf>>, 14 pages.

Govil, et al., "Cellular Disco: Resource Management Using Virtual Clusters on Shared-Memory Multiprocessors," ACM Transactions on Computer Systems, vol. 18, No. 3, Aug. 2000, pp. 229-262.

Hunt, et al., "Sealing OS Processes to Improve Dependability and Safety," Proceedings of the 2nd Annual European Conference on Computer Systems (EuroSys '07), 2007, accessible at <<http://research.microsoft.com/os/singularity/publications/EuroSys2007_SealedProcesses.pdf>>, 14 pages.

Swift, et al., "Improving the Reliability of Commodity Operating Systems," Proceedings of the Nineteenth ACM Symposium on Operating Systems Principles, 2003, accessible at <http://www.cs.rochester.edu/meetings/sosp2003/papers/p116-swift.pdf>, 16 pages.

Witten, et al., "Managing Gigabytes: Compressing and Indexing Documents and Images," abstract of book published by Morgan Kaufmann Publishers, Inc., Second Edition, 1999, accessible at <<http://citeseerx.ist.psu.edu/viewdoc/download;jsessionid=B21D2BB5C7768E9B634841C6B86BAA0A?doi=10.1.1.87.9634&rep=rep1&type=pdf>>, 2 pages.

Hunt, et al., "An Overview of the Singularity Project," Microsoft Research Technical Report, MSR-TR-2005-135, accessible at <<http://research.microsoft.com/os/singularity>>, 44 pages.

Boyd-Wickizer, et al., "Corey: An Operating system for Many Cores," Proceedings of the 8th USENIX Symposium on Operating Systems Design and Implementation, 2008, accessible at <<http://www.cs.brandeis.edu/~cs220/reads/corey-osdi08.pdf>>, 15 pages.

Chakraborty, et al., "Computation Spreading: Employing Hardware Migration to Specialize CMP Cores On-the-fly," Proceedings of the 12th International Conference on Architectural Support for Programming Languages and Operating Systems, 2006, accessible at <<http://pages.cs.wisc.edu/~kchak/papers/csp-asplos06.pdf >>, 10 pages.

Engler, et al., "Exokernel: An Operating System Architecture for Application-Level Resource Management,"Proceedings of the 15th ACM Symposium on Operating Systems Principles, 1995, draft paper available at <<http://www.cs.utexas.edu/users/dahlin/Classes/UGOS/ reading/engler95exokernel.pdf>>, 17 pages.

Fiuczynski, et al., "SPINE—A Safe Programmable and Integrated Network Environment," Proceedings of the 8th ACM SIGOPS European Workshop, 1998, available at <<http://www.cs.princeton.edu/~mef/research/spine/reports/sigops98/ >>, 11 pages.

Jul, et al., "Fine-Grained Mobility in the Emerald System," ACM Transactions on Computer Systems, vol. 6, No. 1, Feb. 1988, pp. 109-133.

Muir, et al., "AsyMOS—An Asymmetric Multiprocessor Operating System," IEEE Conference on Open Architectures and Network Programming, 1998, accessible at <<http://citeseerx.ist.psu.edu/viewdoc/summary?doi=10.1.1.24.9148>>, 10 pages.

Muir, et al., "Functional Divisions in the Piglet Multiprocessor Operating System," Proceedings of the 8th ACM SIGOPS European Workshop on Support for Composing Distributed Applications, 1998, pp. 255-260.

Schmuck, et al., "Experience with transactions in QuickSilver," In Proceedings of the 13th ACM Symposium on Operating Systems Principles, 1991, pp. 239-253.

Schupbach, et al., "Embracing Diversity in the Barrelfish Manycore Operating System," Proceedings of the Workshop on Managed Many-Core Systems, 2008, 9 pages.

Silva, et al., "K42: An Infrastructure for Operating System Research," accessible at <<http://ertos.nicta.com.au/publications/papers/DaSilva_KWWTB_06.pdf>>, 2006, 9 pages.

Weinsberg, et al., "Tapping Into the Fountain of CPUs: On Operating System Support for Programmable Devices," Proceedings of the 13th International Conference on Architectural Support for Programming Languages and Operating Systems, 2008, 10 pages.

Fiuczynski, M. et al.; "Spine: An Operating System for Intelligent Network Adapters," Proceedings of the Eighth ACM SIGOPS European Workshop; Sintra, Portugal, Sep. 1998; pp. 7-12.

Pike, R. et al., "The Use of Name Spaces in Plan 9," ACM SIGOPS Operating Systems Review; vol. 27, Issue 2; Apr. 1993; pp. 72-76.

* cited by examiner

OPERATING SYSTEM DISTRIBUTED OVER HETEROGENEOUS PLATFORMS

BACKGROUND

Computing devices now commonly use co-processors for performing specialized tasks. To cite one example, a general-purpose computing device may include a general-purpose central processing unit (CPU) in combination with a specialized graphics processing unit (GPU). The GPU may perform computation-intensive tasks associated with the execution of a game or other graphics-intensive application. A developer may provide an application which runs on an operating system which provides access to the general-purpose CPU of the computing device. If the application invokes processes which involve access to a co-processor, the computing device typically provides such access through a driver interface using a well-defined protocol.

Co-processors represent rich processing resources, yet there are a number of challenges involved in extending the use of co-processors for more general-purpose applications. For example, a co-processor and a general-purpose CPU may use different instruction set architectures (ISAs). Further, the co-processor and general-purpose CPU may have access to different respective sets of resources. Further, a rigid protocol may govern the manner in which the co-processor interacts with the general purpose CPU. This protocol may make it difficult for the co-processor to access the resources of the CPU in a non-standard manner, and vice versa. Generally, these factors complicate any attempt to integrate the co-processor with more general purpose operations performed by the computing device.

SUMMARY

An illustrative operating system is described that distributes two or more instances of the operating system over heterogeneous platforms of a computing device. The instances of the operating system work together to provide "single-kernel" semantics. Single-kernel semantics allow applications to be written as if they run on a single operating system kernel even though they may in fact be spread across the multiple operating system instances. By virtue of providing single-kernel semantics, application modules can be run on any platform in the computing device without requiring per-platform customization of the application modules. The multiple-platform nature of any platform is effectively "hidden" from an application module code which interacts with the platform via the operating system.

In one case, different platforms are heterogeneous because, for example, they provide different instruction set architectures or different specialized functionality. Alternatively, or in addition, different platforms may correspond to different respective Non-Uniform Memory Access (NUMA) domains that offer different memory latency-related performance. NUMA domains may also have different accessibility and performance characteristics with respect to other system resources, such as peripheral buses.

In one case, each instance of the operating system may include a monolithic kernel. In another case, each instance of the operating system may include a microkernel.

According to another illustrative aspect, the operating system can allow an application module (or other component) to access an operating system component using a local communication path or a remote communication path. For example, assume that an application module invokes a process which makes use of a file system component of the operating system. The application module interacts with a local instance of the operating system that either includes the requested file system component or omits it. In the former case, the application module can access the file system component using a local communication path. In the latter case, the application module can access the file system component using a remote communication path that involves interaction with a remote platform. It may be transparent to the application module itself whether communication is performed using the local or remote communication paths. Further, in the case that a remote communication path is used, an operating system component instance provided by the remote platform may be "unaware" that its resources are being accessed by a non-local agent.

According to another illustrative aspect, the operating system provides transfer functionality for handling communication over a remote communication path. The transfer functionality can operate by forming and sending a message which describes information to be sent to a remote platform. At the remote platform, the transfer functionality operates by: interpreting the message; copying the information described in the message so that the information is available to the remote platform; and sending a confirmation to the local platform that indicates that the remote platform has received the message. At the local platform, the transfer functionality responds to the confirmation by freeing memory associated with the message.

According to another illustrative aspect, the transfer functionality is implemented by software, hardware, or combination of software and hardware. In one case, a software-implemented operating system instance sends information to a hardware-implemented receiving entity.

According to another illustrative aspect, the operating system includes a policy manager module for deciding where to place components among different platforms hosted by a computing device. Consider, for example, a process that involves interaction between a first component and a second component, as described by an interaction relation. The policy manager module operates by identifying an affinity value associated with the interaction relation. The affinity value identifies a sensitivity of the process to the location of the first component relative to the second component. The policy manager module determines a placement of one or more components associated with the process by taking into consideration the affinity value.

According to another illustrative aspect, the affinity value is specified in a manifest which accompanies an application module, the application module being associated with the process.

According to another illustrative aspect, the affinity value can express different types of preferences. For example, a first affinity value may convey that the process is agnostic with respect to the location of components. A second affinity value conveys that the process may benefit by locating the components together on the same platform. A third affinity value conveys that the process may benefit from separating the components on different respective platforms. In the last-mentioned case, the policy manager module can base its placement decision on the affinity value in combination with distance information. The distance information describes the distances between different platforms, where the distances are proxies that express the latency in communication between the different platforms. Affinity values may be derived in a number of ways, including programmer annotation, static analysis, profile-driven feedback, etc.

The above approach can be manifested in various types of systems, components, methods, computer readable media, data structures, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

Figure 1:
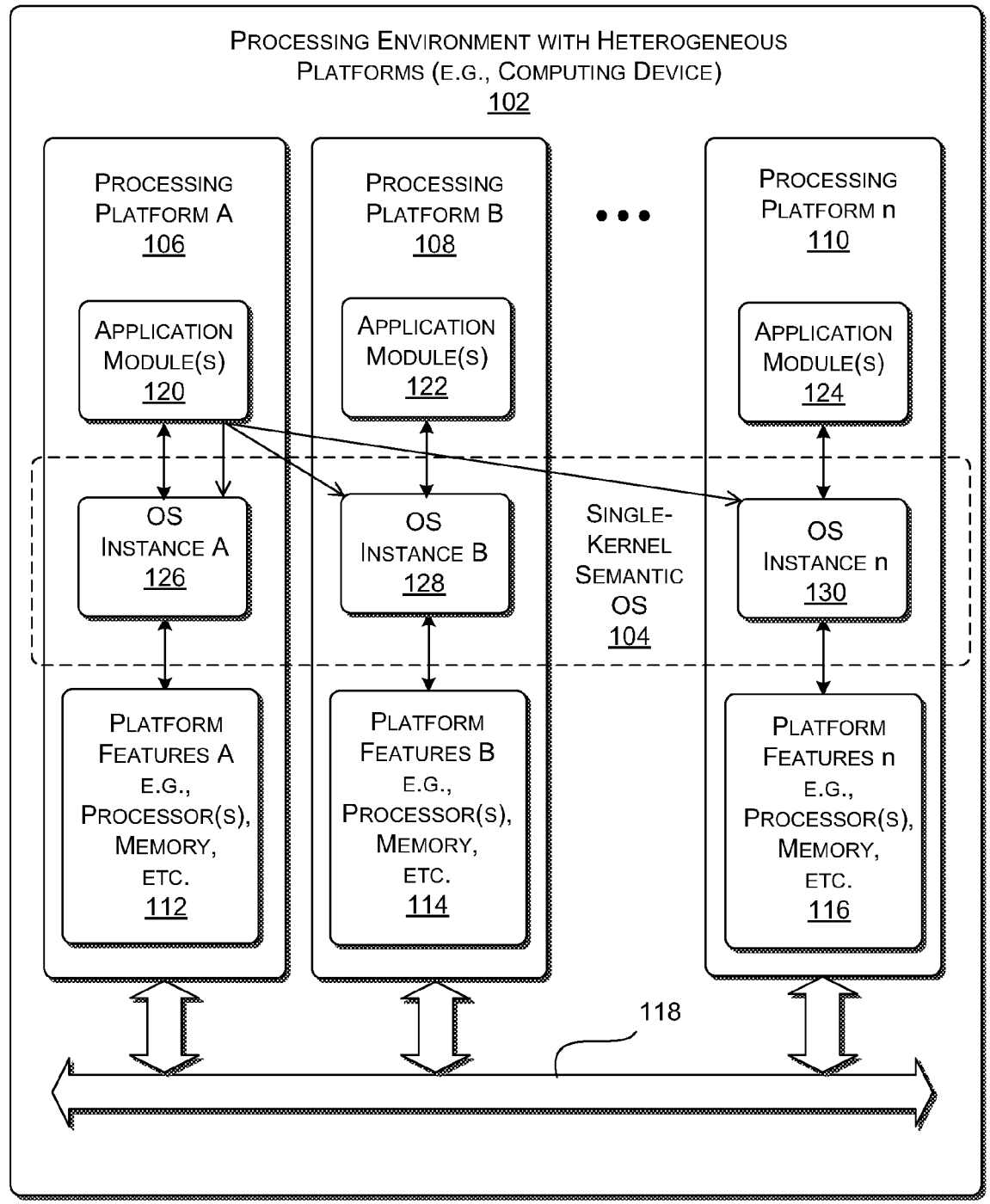
FIG. 1 shows an illustrative processing environment (such as a computing device) including a single-kernel semantic operating system distributed among heterogeneous platforms.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth an illustrative operating system that is distributed over heterogeneous platforms of a computing device. The operating system provides single-kernel semantics to present a common operating system abstraction to application modules. This disclosure is organized as follows. Section A describes illustrative systems for implementing the single-kernel semantic operating system. Section B describes illustrative methods which explain the operation of the systems of Section A.

As a preliminary matter, some of the figures describe concepts in the context of one or more structural components, variously referred to as functionality, modules, features, elements, etc. The various components shown in the figures can be implemented in any manner, for example, by software, hardware (e.g., discrete logic components, etc.), firmware, and so on, or any combination of these implementations. In one case, the illustrated separation of various components in the figures into distinct units may reflect the use of corresponding distinct physical components. Alternatively, or in addition, any single component illustrated in the figures may be implemented by plural physical components. Alternatively, or in addition, the depiction of any two or more separate components in the figures may reflect different functions performed by a single physical component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented by software, hardware (e.g., discrete logic components, etc.), firmware, manual processing, etc., or any combination of these implementations.

As to terminology, the phrase "configured to" encompasses any way that any kind of functionality can be constructed to perform an identified operation. The functionality can be configured to perform an operation using, for instance, software, hardware (e.g., discrete logic components, etc.), firmware etc., and/or any combination thereof.

The term "logic" encompasses any functionality for performing a task. For instance, each operation illustrated in the flowcharts corresponds to logic for performing that operation. An operation can be performed using, for instance, software, hardware (e.g., discrete logic components, etc.), firmware, etc., and/or any combination thereof.

A. Illustrative Systems

A.1. Overview of System

FIG. 1 shows an illustrative processing environment 102 for implementing an operating system 104 that is distributed across multiple heterogeneous platforms (106, 108, ... 110). In one case, the processing environment 102 may correspond to a computing device of any type. Examples of a computing device include a personal computer, a server-type computer, a laptop computer, a game console device, a personal digital assistant device, a mobile telephone device, a set-top box device, and so on. No limitation is placed on what may constitute a processing environment 102 as used herein.

A platform refers to any kind of processing system for performing functions. In one case, a platform may correspond to a general-purpose processing system including one or more general-purpose central processing units (CPUs) and/or other processing resources. In another case, a platform refers to a processing system that was originally designed for performing one or more specialized functions. For example, one platform may include a graphics processing unit (GPU) for performing specialized graphics functions. Another platform may include device interface functionality for interacting with media devices. Another platform may include network interface functionality (e.g., a network interface controller, or NIC) for interacting with a network. Another platform may include a storage controller interface (e.g., a hard-disk controller) for persisting data. Another platform may include another peripheral I/O processor, etc. No limitation is placed on what may constitute a platform as used herein. (For instance, FIG. 2, to be described below, describes additional implementations of platforms.) Although FIG. 1 shows the use of three platforms, the processing environment 102 can include any number of platforms, e.g., less than three platforms or more than three platforms.

In one case, a platform can represent a collection of components that can be physically grouped together in any manner. For example, a platform may be organized on a common substrate, e.g., on a common processing board, detachable card, die, integrated circuit, etc. In another case, a common substrate can implement two or more platforms. Each platform may include one or more platform features. For example, platform A 106 includes platform features A 112. Platform B 108 includes platform features B 114. And platform n 110 includes platform features n 116. In many cases, the features of a platform may include one or more processing units and some form of memory (such as RAM memory).

The platforms (106, 108, . . . 110) are considered heterogeneous because at least two of the platforms (106, 108, . . . 110) differ from each other in one or more ways. For example, two platforms may use different instruction set architectures (ISAs). Alternatively, or in addition, two platforms may include different functional components. For example, one platform may include BIOS functionality, while another may not. One platform may provide cache coherency between processors, while another may not, and so on.

One or more communication conduits 118 couple the platforms (106, 108, . . . 110) together. In one case, the communication conduits 118 may represent one or more buses, such as any type of input-output (I/O) bus. In another case, the communication conduits 118 may represent other types of coupling mechanisms, such a point-to-point connection, etc.

The platforms (106, 108, . . . 110) may each include one or more application modules (120, 122, . . . 124). An application module represents an application program for performing any type of function. To name merely a few examples, one application module may provide a word processing program. Another application module may provide a network browser program. Another application module may provide a media presentation program, and so on. No limitation is placed on what may constitute an application module.

The operating system 104 provides a number of foundational processes that allow the application modules (120, 122, . . . 124) to interact with the platform features (112, 114, . . . 116). For instance, the operating system 104 may include functionality for managing memory, for scheduling events, for accessing media devices, for interacting with a network, and so on.

The operating system 104 is distributed among the platforms (106, 108, . . . 110). More specifically, the operating system 104 provides individual instances of the operating system 104 on each of the platforms (106, 108, . . . 110). That is, platform A 106 includes operating system (OS) instance A 126, platform B 108 includes OS instance B 128, and platform n 110 includes OS instance n 130.

As will be discussed in greater detail below, the OS instances (126, 128, . . . 130) operate using a unified operating system framework. In other words, OS instance A 126 operates based on the same operating system framework or paradigm as OS instance B 128 and OS instance n 130. In the terminology of FIG. 1, the OS instances (126, 128, . . . 130) are said to constitute a single-kernel semantic operating system. Later figures will be used to clarify the meaning of this phrase; in brief, this phase implies that all OS instances (126, 128, . . . 130) work together to provide the abstraction of a single operating system to applications even through the system is composed of multiple OS instances.

As consequence of the above-identified characteristic, the OS instances (126, 128, . . . 130) collectively form a homogenous operating system abstraction that is presented to the application modules (120, 122, . . . 124). This allows a developer to create a single version of an application module that can run on any platform (106, 108, . . . 110). The platform features (112, 114, . . . 116) of the platforms (106, 108, . . . 110) may vary in the manner described above. But the operating system 104 effectively "hides" this particularity from the application modules (120, 122, . . . 124). The developer need not develop customized code to address the underlying particularity of the platforms (106, 108, . . . 110). However, application modules can still benefit from the features of each platform via compilation to a specific platform's features, or via source code specialization, or via linkage to libraries customized for the platform. For example, when run on a network interface platform, an application component could use its hardware-accelerated checksum feature, but when run on another platform, the application component would use software to perform the checksum feature.

The different OS instances (126, 128, . . . 130) can communicate with each other (as described below), but otherwise operate in an independent manner. For example, OS instance A 126 manages platform resources in a manner which is independent of OS instance B 128, and vice versa.

Further, while all the OS instances (126, 128, . . . 130) adopt the same semantic paradigm, this does not mean that all of the OS instances (126, 128, . . . 130) will include the same operating system components. That is, there may be differences in the set of components provided by the respective OS instances (126, 128, . . . 130). To cite merely one example, OS instance A 126 may include a file system component, but OS instance B 128 may omit this functionality. In contrast, OS instance B 128 may include a network interface component, but OS instance A 126 may omit this functionality, etc.

To address this characteristic, the operating system 104 implements local communication paths and remote communication paths. A local communication path allows a requesting entity (such as an application module) that is "resident" in one platform to access an operating system component or other functionality that is resident on the same platform. A remote communication path allows a requesting entity (such an application module) that is resident on one platform to access an operating system component or other functionality that is resident on another platform. To name one example, suppose that an application module on platform A 106 seeks to access a network interface component of the operating system 104. If this component is resident on platform A 106, then the application module can access it via a local communication path. If this component is resident on another platform, then the application module can access it via a remote communication path, e.g., by accessing it from the OS instance B 128 of platform B 108.

As a result of this functionality, any requesting entity (such as an application module) can consider the OS instances (126, 128, . . . 130) as forming a single integrated resource. The fact that a remote communication path may be called on to access a desired component is complexity that is hidden from the requesting entity. As such, the distributed nature of the operating system 104 is transparent with respect to the application modules (120, 122, . . . 124). Further, the components of the operating system 104 may be "unaware" of whether these components are servicing local requesting entities or remote requesting entities.

As a consequence of the above characteristics, the operating system 104 can spread the richness provided by a general-purpose operating system across heterogeneous platforms. This expands the utility of the heterogeneous platforms, without placing special burdens on developers of applications.

In one representative implementation, the processing environment 102 can assign one of the OS instances (126, 128, . . . 130) the role of a core OS instance, and the remainder of the instances as satellite OS instances. For example, assume that platform A 106 includes a general-purpose CPU; in this case, the processing environment 102 can assign OS instance A 126 the role of core OS instance. In another implementation, the processing environment 102 can treat all of the OS instances (126, 128, . . . 130) as equivalent resources, e.g., without identifying a core OS instance. All of the OS instances (126, 128, . . . 130) can be considered to be satellite OS instances.

Different strategies can be used to boot up (e.g., start) the operating system 104. In one merely illustrative case, the processing environment 102 can start up one of the OS instances first (such as the core OS instance), and then use that OS instance to help boot up the others. In the case of a NUMA architecture (to be described below), the boot-up process can enumerate the different NUMA domains. Components within the processing environment 102 can register their presence (and location) using a location determination module (to be discussed below).

Likewise, different strategies can be used to configure the application modules (120, 122, . . . 124). In one approach, the processing environment 102 uses a two-phase compilation strategy that allows the same application module code-base to run on multiple instruction-set architectures (which may be used by different respective platforms). In this approach, an application module is first compiled to an intermediate language (IL). The processing environment 102 then compiles the intermediate language into each platform's native instruction set and links the compiled code with libraries for the platform.

The explanation below describes the features of the processing environment 102 in greater detail. That is, Section A.2 describes the extension of the approach of FIG. 1 to NUMA domains. Section A.3 provides further detail regarding two illustrative implementations of the operating system. Section A.4 provides further detail regarding the implementation of local and remote communication paths. Section A.5 describes the use of a policy manager module to allocate components among diverse platforms. And Section A.6 describes illustrative transfer functionality for passing information between platforms using a remote communication path.

In the following discussion, the general-purpose term "component" refers to any part of the processing environment 102. For example, in one context, a component may refer to a functional module provided by an OS instance. In another context, a component may refer to an application module. In another context, a component may refer to a hardware feature of a platform, such a disk drive, and so on.

A.2. NUMA Domains as Platforms

Figure 2:
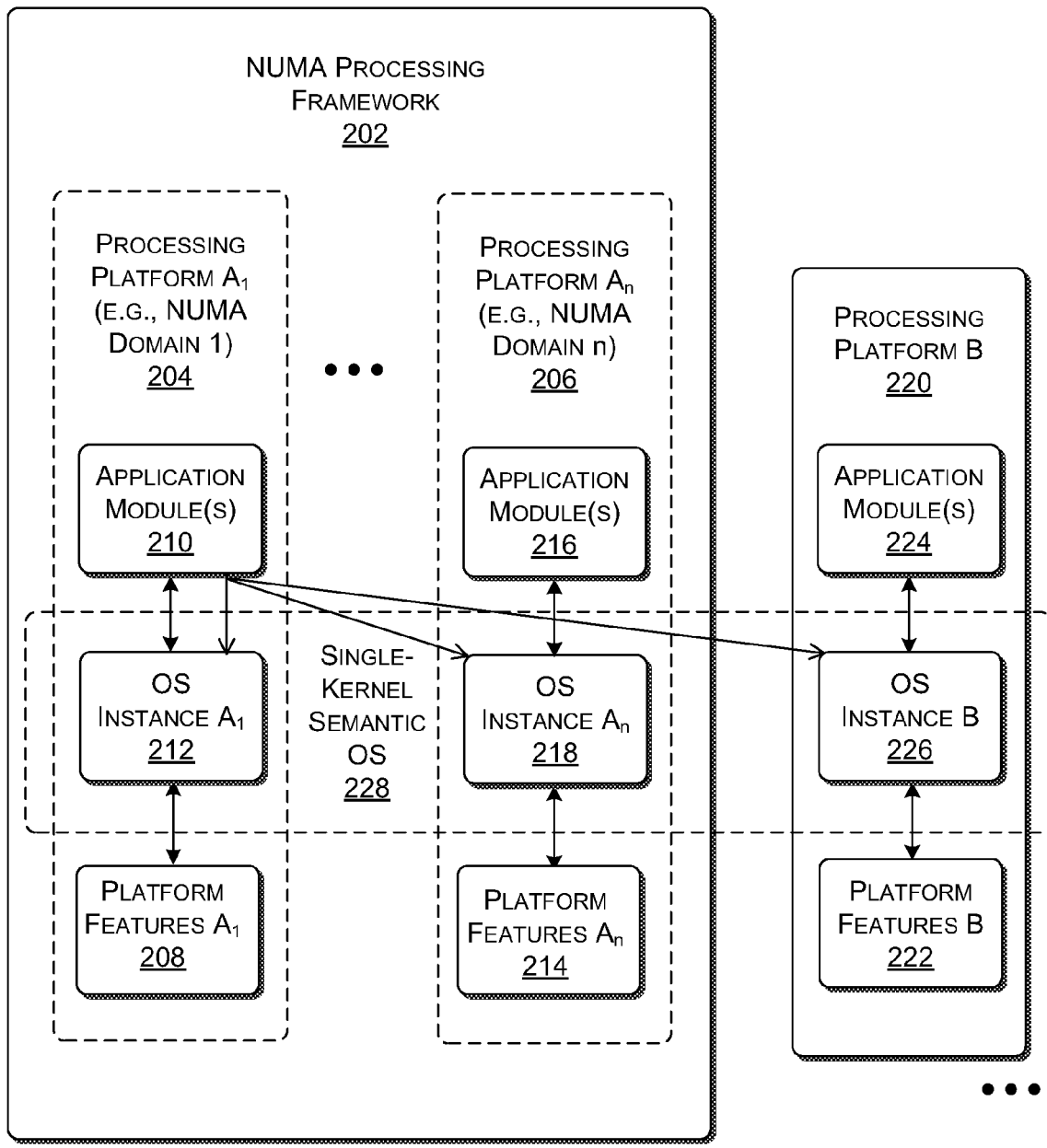
FIG. 2 shows heterogeneous platforms that include two or more Non-Uniform Memory Access (NUMA) domains.

FIG. 2 shows a Non-Uniform Memory Access (NUMA) framework 202. NUMA technology organizes resources into a number of NUMA domains. Each NUMA domain can include one or more processors, memory, etc. Each domain has a physical address space which is considered local. A processor can access memories within its local domain faster than it can access memories outside its domain. This architecture may allow memory bandwidth to scale within an increase in the number of processors, may reduce cache contention between processors, and may decrease power usages.

Each NUMA domain can be redefined as a processing platform in the context of the processing environment 102 shown in FIG. 1. For example, the NUMA framework 202 includes a platform $A_1$ 204 associated with a first NUMA domain and a second platform $A_n$ 206 associated with a second NUMA domain. While two NUMA domains are shown, an implementation can include any number of NUMA domains and associated platforms.

As described above, each platform can include a collection of features, an OS instance, and one or more application modules which interact with the features via the OS instance. For example, platform $A_1$ 204 includes platform features $A_1$ 208, application modules 210, and OS instance $A_1$ 212. Platform $A_n$ 206 includes platform features $A_n$ 214, application modules 216, and OS instance $A_n$ 218.

FIG. 2 also indicates that the NUMA-related platforms (204, 206) can cooperate with one or more platforms associated with special-purpose functionality (such as special-purpose processing units). For example, FIG. 2 shows a platform B 220 that includes platform features 222, application modules 224, and OS instance B 226. This platform B 220, for example, may include one or more processors for performing specialized graphics processing operations. The platforms (204, 206) associated with different NUMA domains can also be considered heterogeneous because they offer different memory access performance.

An operating system 228 collectively represents the functionality provided by the separate OS instances (212, 218 . . . 226). The operating system 228 has all the characteristics described above in Section A.1. For example, the operating system 228 provides a single-kernel semantic framework. This allows application modules (210, 216, . . . 224) to be implemented on any platform without taking the particularities of the underlying platforms (204, 206, . . . 220) into account.

In the context of FIG. 2, the application modules (210, 216) can be placed in NUMA domains that provide the data structures and code that are predominantly used by the application modules (210, 216).

The principles described in this section are not limited to NUMA architectures, but, rather, can be applied to other multi-processor architectures, such as, but not limited to, symmetric multiprocessing (SMP) architectures.

A.3. Illustrative Operating System Implementations

The OS instances (126, 128, . . . 130) of the operating system 104 (of FIG. 1) can be implemented using different architectures. Without limitation, one implementation uses a monolithic kernel architecture. Another implementation uses a microkernel architecture. Other implementations can use hybrid architectures which integrate features of monolithic architectures and microkernel architectures. Generally, a kernel of an operating system represents a core set of functions that allow higher-level modules to interact with the resources of a computing device. For example, the kernel typically provides functionality for managing memory, for scheduling tasks, and so on. A computing device typically applies a highest level of security to the code that implements the kernel.

Figure 3:
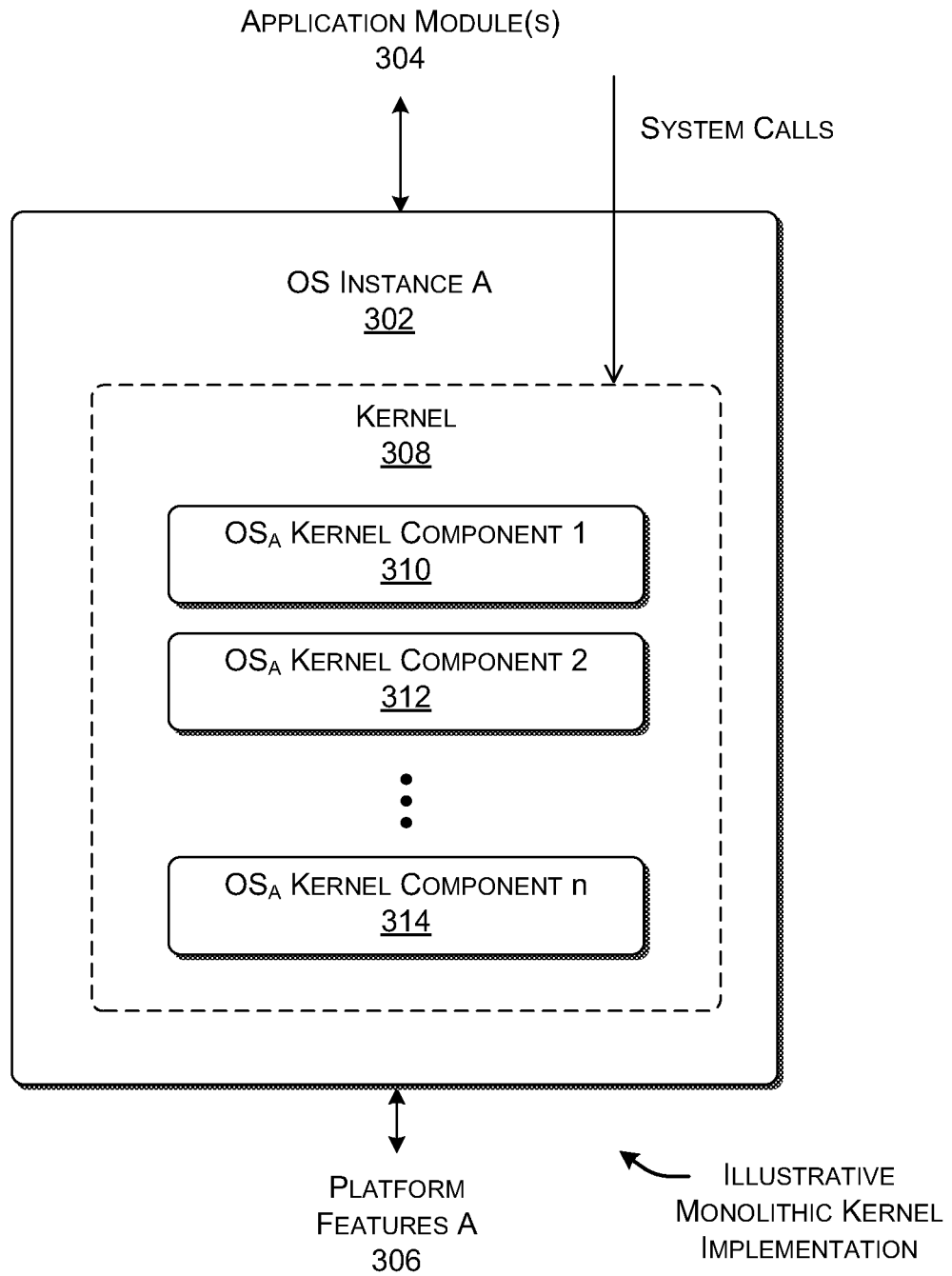
FIG. 3 shows an implementation of an instance of an operating system using a monolithic kernel.

FIG. 3 shows a high-level depiction of an OS instance A 302 that is implemented using a monolithic kernel architecture. The OS instance A 302 allows application modules 304 to interact with a collection of platform features A 306 provided by a platform A. The OS instance A 302 includes a kernel 308 that provides a collection of operating system (OS) kernel components (310, 312, . . . 314). Each OS kernel component performs a task. For example, one OS kernel module may perform a memory management task, another OS kernel component may perform a scheduling task, another OS kernel component may perform a file management task, and so on. The kernel 308 is monolithic in the sense that all of its OS components operate "within" the kernel 308, e.g., within a single address space defined by the kernel 308.

Figure 4:
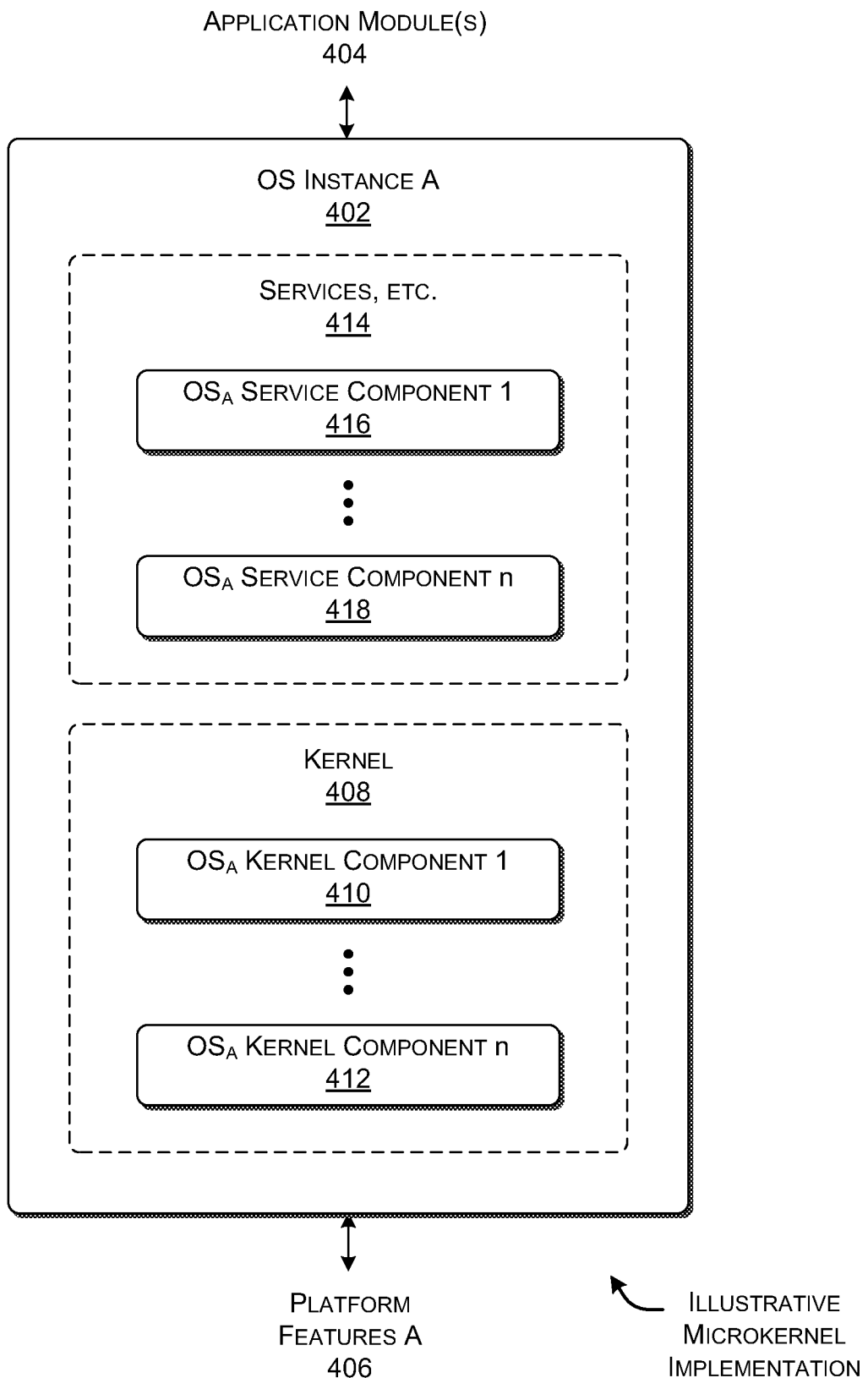
FIG. 4 shows an implementation of an instance of an operating system using a microkernel.

FIG. 4 shows a high-level depiction of an OS instance A 402 that is implemented using a microkernel architecture. The OS instance A 402 allows application modules 404 to interact with a collection of platform features A 406 provided by a platform A. The OS instance A 402 includes a kernel 408 that provides a collection of operating system (OS) kernel components (410, . . . 412). The OS instance A 402 also includes services 414 that provide a collection of OS service components (416, . . . 418). The OS kernel components (410, . . . 412) typically perform more foundational tasks compared to the OS service components (416, . . . 418). For example, one OS kernel component may perform a memory management task, another OS kernel component may perform a scheduling task, and so on. One OS service component may perform a file management task, another OS service component may perform a network interface task, and so on. The kernel 408 is referred to as a microkernel because there is an attempt to isolate the most basic operations of the operating system within the kernel 408, thus producing a smaller kernel compared to the case of a monolithic kernel. The functions associated with the services 414 can be considered as "outside" the kernel 408.

In view of the separation of functions, a microkernel architecture may employ a message-passing protocol to allow components within the kernel 408 to interact with components within the services 414. A monolithic architecture omits such message-passing protocol. In a monolithic architecture, an application module accesses all the functions provided by the kernel 308 using system calls or the like.

The operating system 104 can be implemented by extending and modifying any existing operating system framework. For example, without limitation, as to the monolithic approach, the operating system 104 can be implemented on the basis of the Windows® operating system provided by Microsoft Corporation of Redmond, Wash. As to the microkernel approach, the operating system 104 can be based on Microsoft's Singularity operating system, e.g., as set forth in Galen Hunt, et al., "An Overview of the Singularity Project," Microsoft Research Technical Report MSR-TR-2005-135. The Singularity operating system uses channels to allow OS kernel components to interact with OS service components, as defined by contracts.

A.4. Local and Remote Communication Paths

As introduced with respect to FIG. 1, a requesting entity (such as an application module) can request a component within its own platform using a local communication path. A requesting entity can request a component on another platform using a remote communication path.

Figure 5:
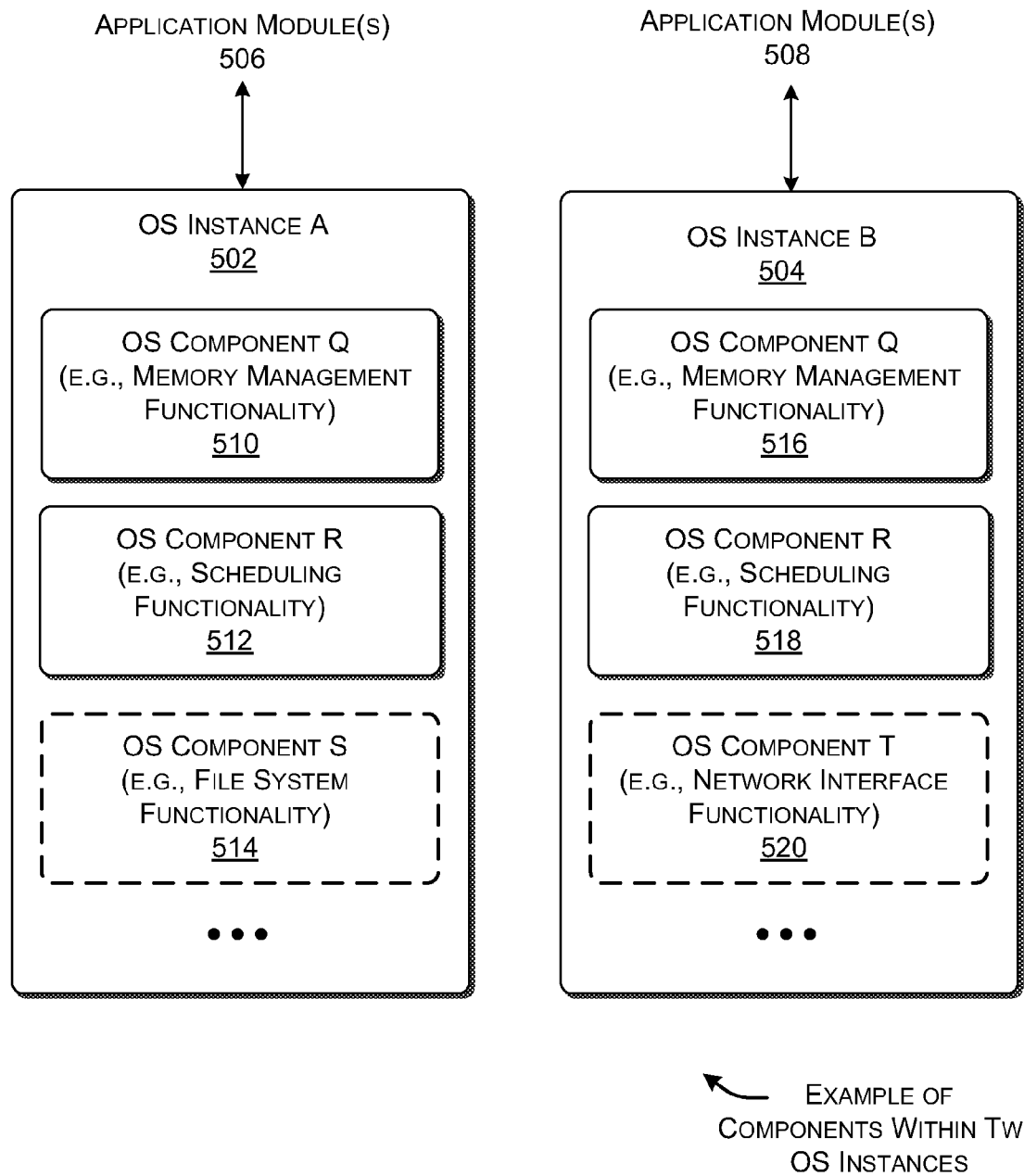
FIG. 5 shows illustrative components that may be found in two representative instances of an operating system.

FIG. 5 describes an illustrative context in which local communication paths and remote communication paths can be used. The figure shows two OS instances, that is, OS instance A 502 that operates on a platform A and OS instance B 504 that operates on a platform B. One or more application modules 506 are located on platform A, while one or more application modules 508 are located on platform B.

For the purpose of this discussion, the OS instance can be implemented using any approach, such as a monolithic kernel architecture, a microkernel architecture, etc. In any implementation, OS instance A 502 includes a number of OS components (510, 512, . . . 514) and OS instance B 504 includes a number of OS components (516, 518, . . . 520). Some OS components can be present on both OS instances (502, 504). For example, assume OS components 510 and 516 perform a memory management task, and OS components 512 and 518 perform a scheduling task. (Although, note, as explained above, that the OS components on different platforms operate in an independent manner.) Other OS components can be present on one OS instance, but not the other. For example, OS component 514, which is present on OS instance A 502, provides file system functionality; this component is not present on OS instance B 504. Further, OS component 520, which is present on OS instance B 504, provides network interface functionality (e.g., a network stack); this component is not present on OS instance A 502.

As a result, the application modules 506 resident on platform A can use a local communication path to access any of the OS components (510, 512, 514) that are present in OS instance A 502, but the application modules 506 use a remote communication path to access the OS component 520 that provides network interface functionality (because this component is present on OS instance B 504). Likewise, the application modules 508 resident on platform B can use a local communication path to access any of the OS components (516, 518, 520) that are present in OS instance B 504, but the application modules 508 use a remote communication path to access the OS component 514 that provides file system functionality (because this component is present on OS instance A 502).

Figure 6:
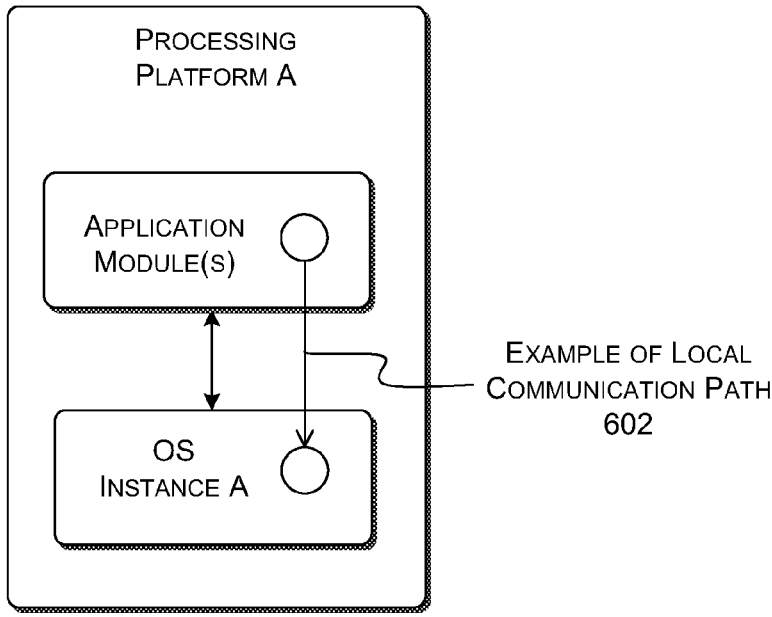
FIG. 6 shows a local communication path within a platform.
Figure 7:
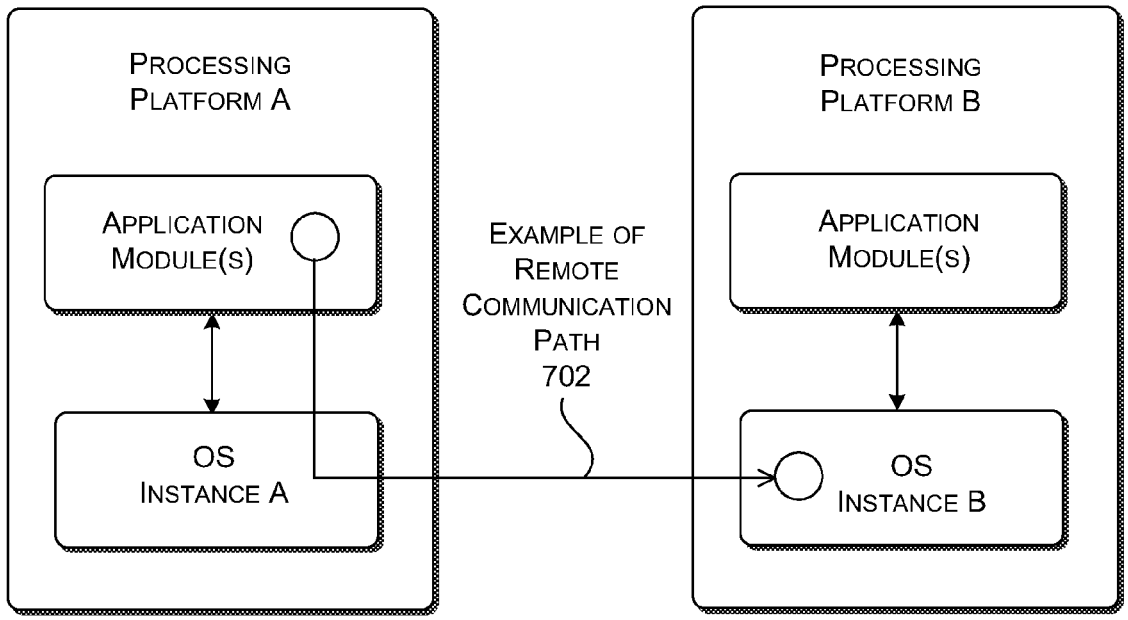
FIG. 7 shows a remote communication path between two platforms.

FIGS. 6 and 7 supplement the above explanation by providing a graphical depiction of different communication paths. In FIG. 6, application modules (or other requesting entities) use a local communication path 602 to access OS components and other resources within a same platform. In FIG. 7, application modules (or other requesting entities) use a remote communication path 702 to communicate from one platform to another.

Figure 8:
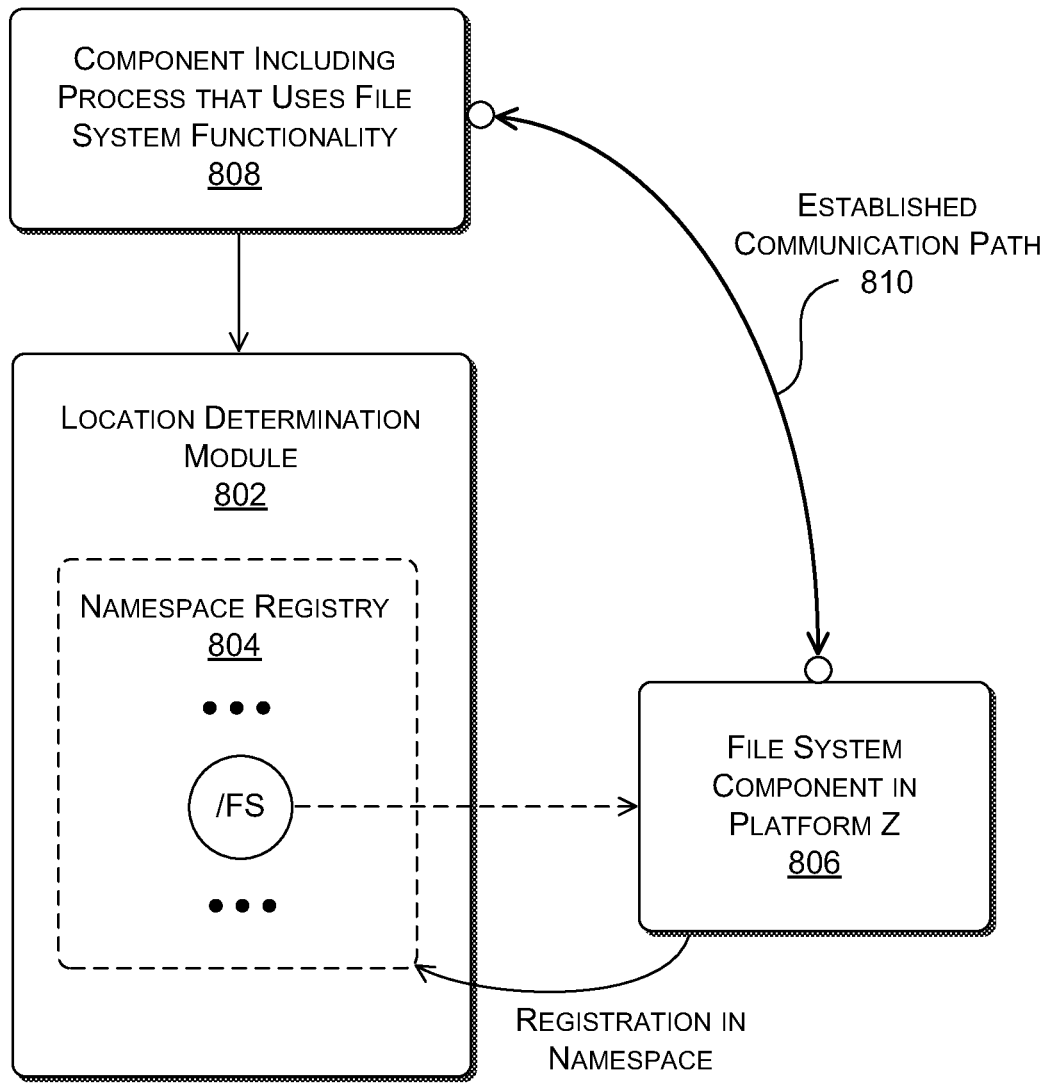
FIG. 8 shows a location determination module which plays a role in determining whether a local or remote communication path is to be used to access a component.

FIG. 8 shows one way to provide a communication path (local or remote) using a location determination module 802. In one case, the location determination module 802 is a feature of the operating system 104 that is resident on one OS instance on one associated platform. In another case, the location determination module 802 can be distributed over plural OS instances on plural respective platforms. In any case, the location determination module represents a global resource that can be used by any component within the processing environment 102.

The location determination module 802 generally operates by registering the locations of components within the processing environment 102. The location determination module 802 can thereafter inform a requesting entity (such as an application module) of the location of a component that it seeks to interact with. The location determination 802 can also set up a communication path between the requesting entity (e.g., an application module) and the requested component.

In one implementation, the location determination module 802 performs the above-described role using a namespace registry 804. The namespace registry 804 maintains information regarding the locations of components within the processing environment 102 and the types of functions performed by the components. For example, the namespace registry 804 can indicate that a platform Z includes an OS instance with a file system component 806. In one case, the namespace registry 804 learns about the file system component 806 when the file system component 806 notifies it of its presence, e.g., when the file system component 806 is started up, or at some other juncture. In one case, the location determination module 802 can represent the function performed by the file system component 806 with a path indicator, such as, without limitation, the path indicator /FS.

Now suppose that a component 808 (such as an application module) includes a process which involves the use of file system functionality. The component 808 can call in to the location determination module 802 to determine that there is a file system component 806 on platform Z that meets its needs. The location determination module 802 can then establish a communication path 810 between the requesting component 808 and the file system component 806. The communication path 810 is local if the component 808 is located in the same platform as the file system component 806, and remote otherwise.

In a microkernel environment, an OS instance can execute a local communication path with a local channel and a remote communication path with a remote channel. In a monolithic environment, an OS instance allows an application module (or other requesting entity) to access any resource in its own local platform by using a system call. The OS instance can implement a remote communication path when it receives a system call for functionality that it does not contain. The OS instance can send a message to a remote platform that does provide the requested functionality. Still other implementations are possible.

A.5. Policy Manager Module

A policy manager module determines the placement of various components within the processing environment 102. Here, the term component is to be construed broadly. In many cases, the policy manager module operates to place an application module (or part thereof) on an identified platform; in this context, the application module constitutes a component. In another case, the policy manager module operates to place a part of the operating system on an identified platform; in this context, the part constitutes a component.

Figure 9:
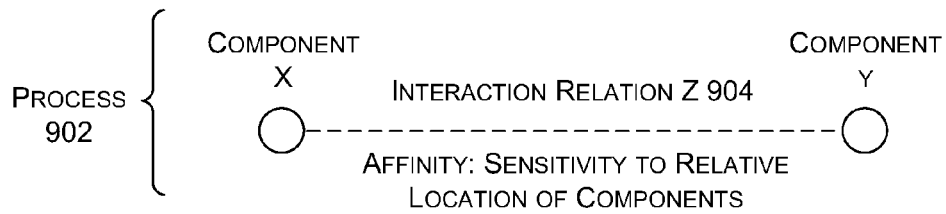
FIG. 9 shows a process that involves interaction between a first component and a second component, as defined by an interaction relation.

The scenario shown in FIG. 9 provides a context that is useful in explaining the operation of the policy manager module. Thus, before advancing to a discussion of the policy manager module itself, FIG. 9 will be described. In FIG. 9, assume that an application module or other functionality is associated with a number of processes. Assume that one of these processes is a process 902. In this process 902, a component X is associated with a component Y via an interaction relation Z 904. In one merely representative case, component X may correspond to the application module itself or part thereof. Component Y may correspond to a component of the operating system 104, such as a file system component. In this scenario, the process 902 may entail interaction between the application module and the file system component, as governed by the interaction relation Z 904. In another scenario, components X and Y may represent two components of the operating system 104. In this scenario, the process 902 may entail interaction between the two components of the operating system 104 via the interaction relation Z 904.

Assume next that the component X has not yet been placed within the processing environment 102. In this context, the goal of the policy manager module is to determine an appropriate location to place component X relative to component Y. It is also possible to use the policy manager module in the opposite scenario, e.g., to determine an appropriate location to place component Y relative to component X. In another case, assume that neither components X nor Y have been placed. The policy manager module then operates to determine an appropriate placement of both components. But to provide a concrete explanation, the following explanation is framed mainly in the first-identified scenario in which the goal is to place component X relative to component Y. In general, the policy manager module places a component by using one of the available platforms to run it.

One factor that guides the placement of components is a degree to which the process 902 is sensitive to the relative location of components. For example, in one case, the process 902 may benefit from a low amount of latency in the interaction between components X and Y. This factor may warrant placing the components on the same platform. In other cases, the process 902 may benefit from a low amount of interference between components X and Y. This factor may warrant isolating the components on different platforms. In other cases, the process 902 may be relatively indifferent (agnostic) as to the relative locations of component X and component Y. This factor may not have any influence on the placement of components X and Y. Still other considerations may govern the placement of components within the processing environment 102.

Figure 10:
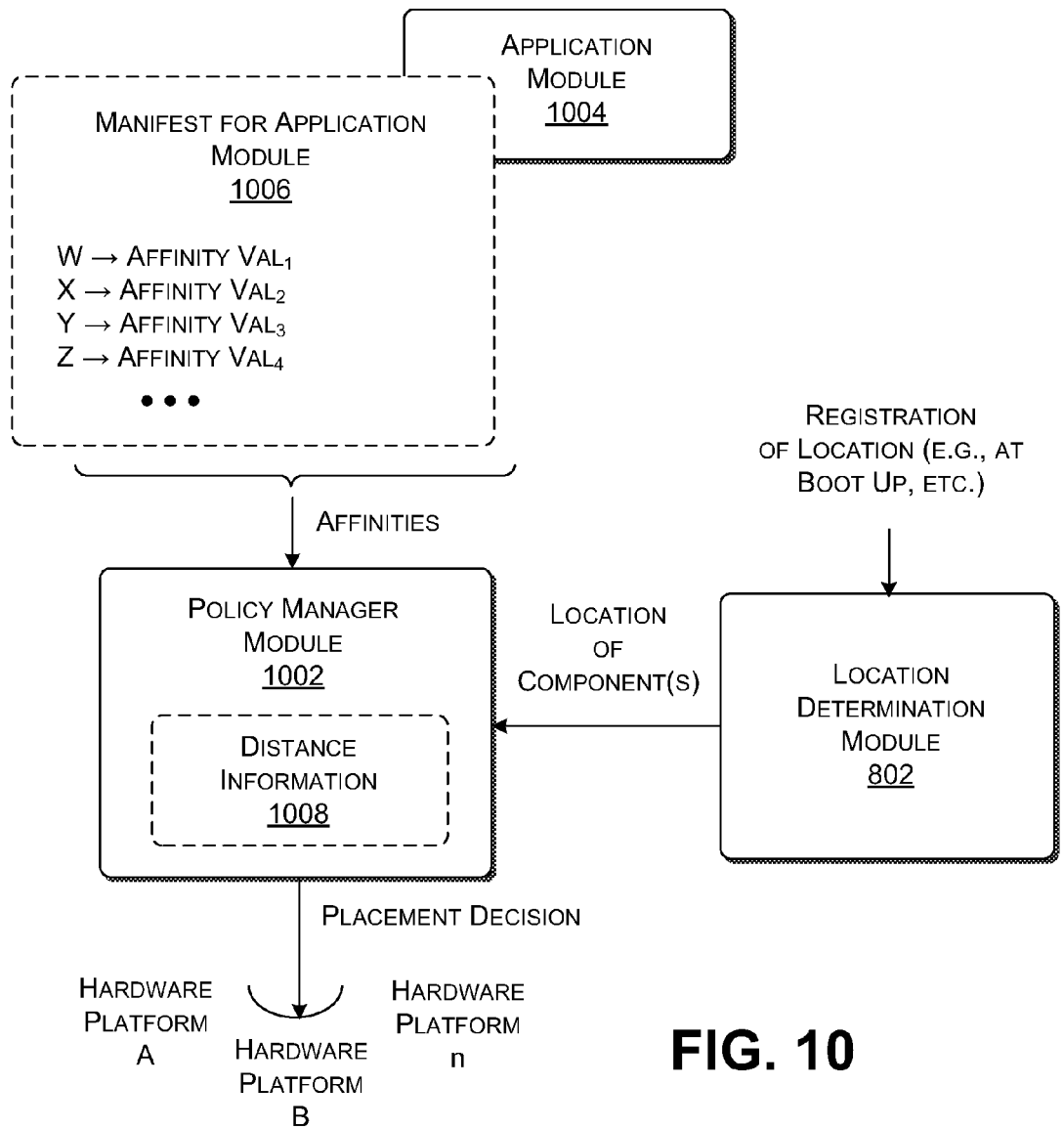
FIG. 10 shows a policy manager module which determines placement of components among platforms based on affinity values provided in a manifest (which accompanies an application module).

Advancing to FIG. 10, this figure shows a policy manager module 1002 which places components within the processing environment 102. To facilitate explanation, consider the representative scenario in which the goal is to place an application module 1004 relative to other components within the processing environment 102. In other words, in this context, the application module 1104 corresponds to component X of FIG. 9.

A manifest 1006 may accompany the application module 1004. The manifest 1006 provides metadata associated with the application module 1004. In part, the manifest 1006 can identify the processes that are associated with the application module 1004, and the interaction relations associated with these processes. In the merely representative example shown in FIG. 10, the application module 1004 is associated with four interaction relations, labeled as relations W, X, Y, and Z. Further, the manifest 1006 assigns an affinity value to each of the interaction relations, e.g., affinity values $Val_1$, $Val_2$, $Val_3$, and $Val_4$.

The affinity values represent the sensitivity of an interaction relation to the relative location of components in the manner described above (with respect to FIG. 9). In one merely representative case, an affinity value of 0 indicates no preference as to the relative placement of components. A positive affinity value indicates a preference that two components associated with the interaction relation be located together, e.g., on the same platform. The magnitude of such a positive value reflects the assessed "strength" of that preference. A negative affinity indicates a preference that the two components be separated apart, e.g., on different platforms. The magnitude of such a negative value reflects the assessed strength of that preference.

The policy manager module 1002 receives the manifest 1006 and extracts the affinity values from it. The policy manager module 1002 uses the affinity values as one factor in determining where to place the application module 1004 (in this specific representative scenario). To make this decision, the policy manager module 1002 also receives location information from the location determination module 802 (which was introduced in the context of the explanation of FIG. 8). As discussed, the location determination module 802 registers the location of components (e.g., operating system components, application modules, etc.) within the processing environment 102. The policy manager module 1002 uses the location information to map information obtained the manifest 1006 to actual locations of components within the processing environment 102.

For the particular case of negative affinity values, the policy manager module 1002 also consults distance information 1008. The distance information 1008 provides information which reflects the relative separation between different parts of the processing environment 102, such as different platforms. For example, the distance information 1008 can indicate that components within a single platform have a distance of 0 (or other small distance value) between them. Components between different NUMA domains may have a larger distance (compared to intra-platform interaction), but still relatively small. And components between distinct platforms connected via an I/O bus have a still larger distance, and so on. The policy manager module 1002 uses the distance information to determine a placement of components which most readily satisfies a negative affinity value. For example, if the affinity value is −3 (which, in one scenario, may be considered to express a strong preference), then the policy manager module 1002 may attempt to locate the components on two disparate platforms connected via an I/O bus.

In some cases, the policy manager module 1002 may attempt to place the application module 1004 as a single resource on one platform. In another case, where appropriate, the policy manager module 1002 may attempt to break the application module 1004 into parts and distribute it over two or more platforms.

In certain instances, the affinity value expressed for one interaction relation may conflict with the affinity value expressed for another interaction relation. For example, one affinity may warrant placing the application module 1004 on platform M, while another affinity value may warrant placing the application module 1004 on platform N. To address this situation, the policy manager module 1002 can apply various environment-specific rules. In one representative case, assume that both a positive affinity value and a negative affinity value influence the placement of a component in conflicting ways. Here, the policy manager module 1002 can let the positive affinity value govern the placement of the component (thus, the positive affinity value overrides the negative affinity value). Assume next that two or more positive affinity values (or two or more negative affinity values) influence the placement of a component. Here, the policy manager module 1002 can let the affinity value with the largest absolute value govern the placement decision. The policy manager module 1002 may also consider the load on each platform when making the placement decision. For example the policy manager module 1002 may favor a first platform over a second platform with equal affinity if the first platform is running fewer components than the second platform.

Different events may trigger initiation of the analysis performed by the policy manager module 1002. In one case, the policy manager module 1002 is invoked when an instruction is made to run a component, such as the application module 1004. For example, a shell associated with the application module 1004, which resides on a particular platform, can act as the agent which invokes the policy manager module 1002 (when an instruction is received to execute the application module 1004). The policy manager module 1002 can then determine where to place the application module 1004 in relation to its shell. An affinity value between the shell and the application module 1004 can specify a preference as whether or not the application module 1004 is to run on the platform on which it was launched. The policy manager module 1002 can also be invoked upon initialization of other parts of the operating system 104, such as operating system service components.

In one implementation, the affinity values serve as non-binding suggestions or hints. Therefore, depending of various contextual factors, the policy manager module 1002 can make a placement decision which is contrary to one or more affinity values.

The approach described above can be expanded and varied in any number of ways. For example, in many of the scenarios described above, an interaction relation (to which an affinity value may be attached) may reflect a use-type interaction between two components to perform some cooperative task. For example, an interaction relation may describe the manner in which the application module 1004 interacts with an operating system component or other resource, or an operating system component interacts with another operating system component, or the application module 1004 interacts with another application module, and so on. In another case, an interaction relation may more loosely reflect a relationship between components. For example, consider the case in which the operation of one component may interfere with another component, even though these two components are not expressly designed to interact with each other. In this case, an interaction relation can be defined for the components, and an affinity value can be associated with this interaction relation. A negative value would convey a preference that these two components be located on different platforms.

According to another aspect, an appropriate person (e.g., a program developer) can manually select the affinity values. Alternatively, or an addition, an automated or semi-automated affinity-determining agent (not shown) can generate the affinity values.

According to another aspect, the selection of affinity values (whether manual or automated) can also be based on an analysis of the capabilities of the platforms.

According to another aspect, affinity values can be generated at any juncture. In one case, an appropriate person and/or automated agent can provide the affinity values based on any static placement consideration or combination of considerations. As described above, these affinity values can be applied when the processes associated with the affinity values are run. Alternatively, or in addition, the affinity values can be dynamically generated (and applied) at any juncture (including during the operation of the components) based on any consideration or combination of considerations.

According to another aspect, in one case, an affinity value can be defined with respect to one component (e.g., "endpoint") in the interaction relation, such as the application module 1004. In another case, affinity values can be defined with respect to both components (e.g., "endpoints") of the relation.

According to another aspect, placement decisions can be based on others considerations, including dynamic considerations, such as the current and/or anticipated usage of resources on the platforms (e.g., as reflected by CPU load, memory usage, etc.).

The policy manager module 1002 can encompass yet additional features and capabilities.

A.6. Transfer Functionality

Figure 11:
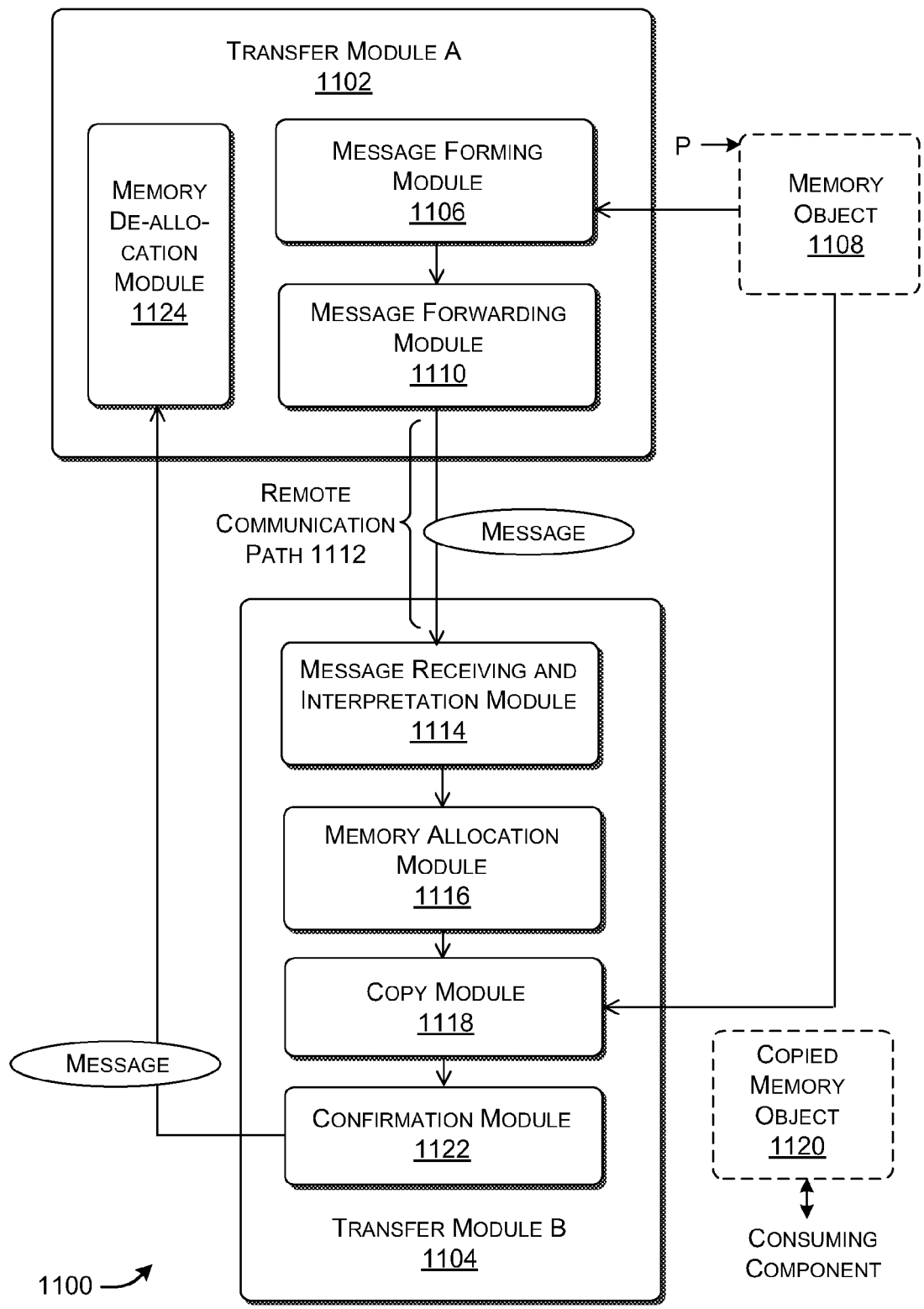
FIG. 11 shows transfer functionality for communicating information over a remote communication path between two platforms.

FIG. 11 shows transfer functionality 1100 for passing information over a remote communication path between two components. For example, the remote communication path may link two operating system components of two respective OS instances (on different respective platforms). To name merely one representative scenario, assume that an application module contacts its local OS instance to send a packet of information to a network interface component. Since the local operating system interface does not include such a component, it may direct the application module to an OS instance of a remote platform (which does include the network interface component).

FIG. 11 shows a transfer module A 1102 that is associated with a sending entity, e.g., an entity that sends information over a remote communication path. Transfer module B 1104 is associated with a receiving entity, e.g., an entity which receives the information. It will be appreciated that the sending entity can also function as a receiving entity, and therefore also includes the functionality of the transfer module B 1104. And the receiving entity can also function as the sending entity, and therefore also includes the functionality of the transfer module A 1102.

Starting first with the sending operations, transfer module A 1102 includes a message forming module 1106. In one implementation, the message forming module 1106 forms a message that describes information to be transferred. For example, assume that the goal is to transfer a memory object 1108 to the receiving entity. For example, the memory object 1108 may pertain to a packet of information to be provided to a network interface component of the operating system 104, etc. Here, the message forming module 1106 forms a message that describes the memory object 1108.

The message forming module 1106 can use various features to characterize the memory object 1108. In one example, assume that the memory object 1108 is present in the memory of a local platform or at some other source memory space. Further assume that the memory object 1108 represents the information using one or more data structures. In this case, the memory object 1108 can be described by providing a pointer which points to the location of the memory object 1108 in local memory. The memory object 1108 can also be described by specifying its size. The memory object 1108 can also be described by providing an offset. The offset describes the location of any feature (such as an internal pointer, etc.) within the memory object 1108 (which may be specified by a compiler during a compilation process). Accordingly, in one case, the message forming module 1106 may form a message by specifying a pointer, offset, and size associated with the memory object 1108. In more complex cases, the memory object 1108 may include multiple parts that can be described by providing multiple pointers, offsets, sizes, etc. In these cases, the message forming module 1106 can provide a description which enumerates these features of the memory object 1108 in any environment-specific manner.

A message forwarding module 1110 forwards the message generated by the message forming module 1106 over a remote communication path 1112 to the receiving entity. In one case, the message forwarding module 1110 can pass the message itself, e.g., which includes one or more pointers, one or more offsets, one or more sizes, etc. In another case, the message forwarding module 1110 can pass a pointer to the message that has been formed (which either directly or indirectly links to the message). Still other strategies can be used to convey information to the receiving entity. Indeed, the message forwarding module 1110 can pass the information provided in the memory object 1108 itself, rather than its description.

Now advancing to the transfer module B 1104 of the receiving entity, a message receiving and interpretation module 1114 receives the message and unpacks the description provided by the message. A memory allocation module 1116 then uses the description to allocate memory in a target memory space, such as the memory provided by the receiving entity's local platform. A copy module 1118 then proceeds to copy the information described in the message from the sending entity's memory space to the target memory space, to thereby provide copied memory object 1120. The copying operation can be implemented using different mechanisms depending, in part, on the capabilities of the sending entity, the capabilities of the receiving entity, the nature of the information itself, etc. In one case, the copying operation involves a memory-to-memory transfer, conducted with or without DMA.

The receiving entity can next notify a consuming component of the receiving entity of the arrival of the information. The consuming component refers to that component of the receiving entity which uses the information that has been sent. In the representative scenario developed here, the consuming component may represent a process provided by a network interface component. It may be transparent (e.g., unknown or irrelevant) to the consuming component whether the information originates from a remote platform or its own platform.

A confirmation module 1122 next sends a confirmation back to the transfer module A 1102. In one case, the confirmation constitutes the same message (or pointer to the message) that was sent to the transfer module B 1104. A memory de-allocation module 1124 at the transfer module A 1102 receives the confirmation and proceeds to free up the memory associated with memory object 1108. That is, the transfer module A 1102 interprets the confirmation as an indication that the transfer module B 1104 has successfully copied the information, and therefore there is no need to continue to maintain the information in the memory space of the sending entity.

In one implementation, the transfer functionality 1100 can be entirely implemented by software. In another implementation, the transfer functionality 1100 can be entirely implemented by hardware, such as by discrete logic components, an application specific integrated circuit, etc. In another implementation, the transfer functionality 1100 can be implemented by a combination of software and hardware. Still other implementations are possible.

In a software implementation, various sub-modules in the transfer modules (1102, 1104) can perform functions that are dependent on one or more contextual factors. For example, the message forming module 1106 can form a message that depends on the particular platform on which it is being used, or the particular information that is being described, etc. Likewise, the message receiving and interpretation module 1114 can interpret the received message in a manner that is dependent on one or more contextual factors. In contrast, in some hardware implementations, the various sub-modules of the transfer modules (1102, 1104) may be designed to serve specific functions in specific contexts, and may therefore represent less flexible functionality. (However, it is also possible to configure a more flexible hardware implementation by accommodating multiple selectable operation modes or the like).

In one case, the transfer module A 1102 and transfer module B 1104 may represent parts of two respective OS instances. In an alternative case, either the transfer module A 1102 or the transfer module B 1104 (or both) may represent functionality that is outside the context of an operating system framework or functionality that implements selected functions of an operating system framework in hardware. For example, the transfer module A 1102 may represent a component of a software-implemented OS instance that sends information to a hardware device that is not governed by any operating system paradigm or which implements selected functions of an operating system framework in hardware. For example, the hardware device can incorporate enough functionality to perform the role of transfer module B 1104.

B. Illustrative Processes

Figure 12:
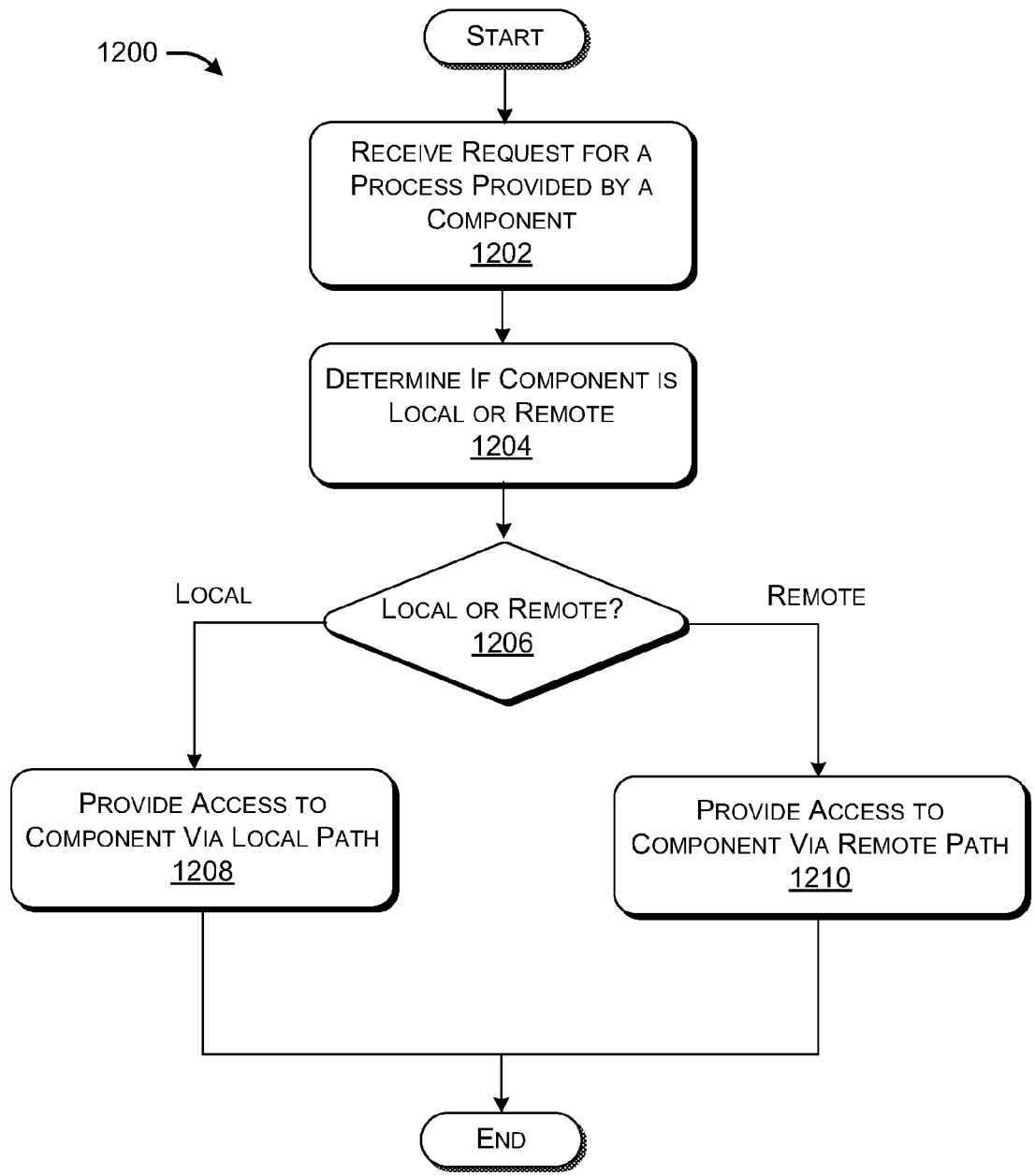
FIG. 12 shows an illustrative procedure for providing access to a component using either a local communication path or a remote communication path.
Figure 13:
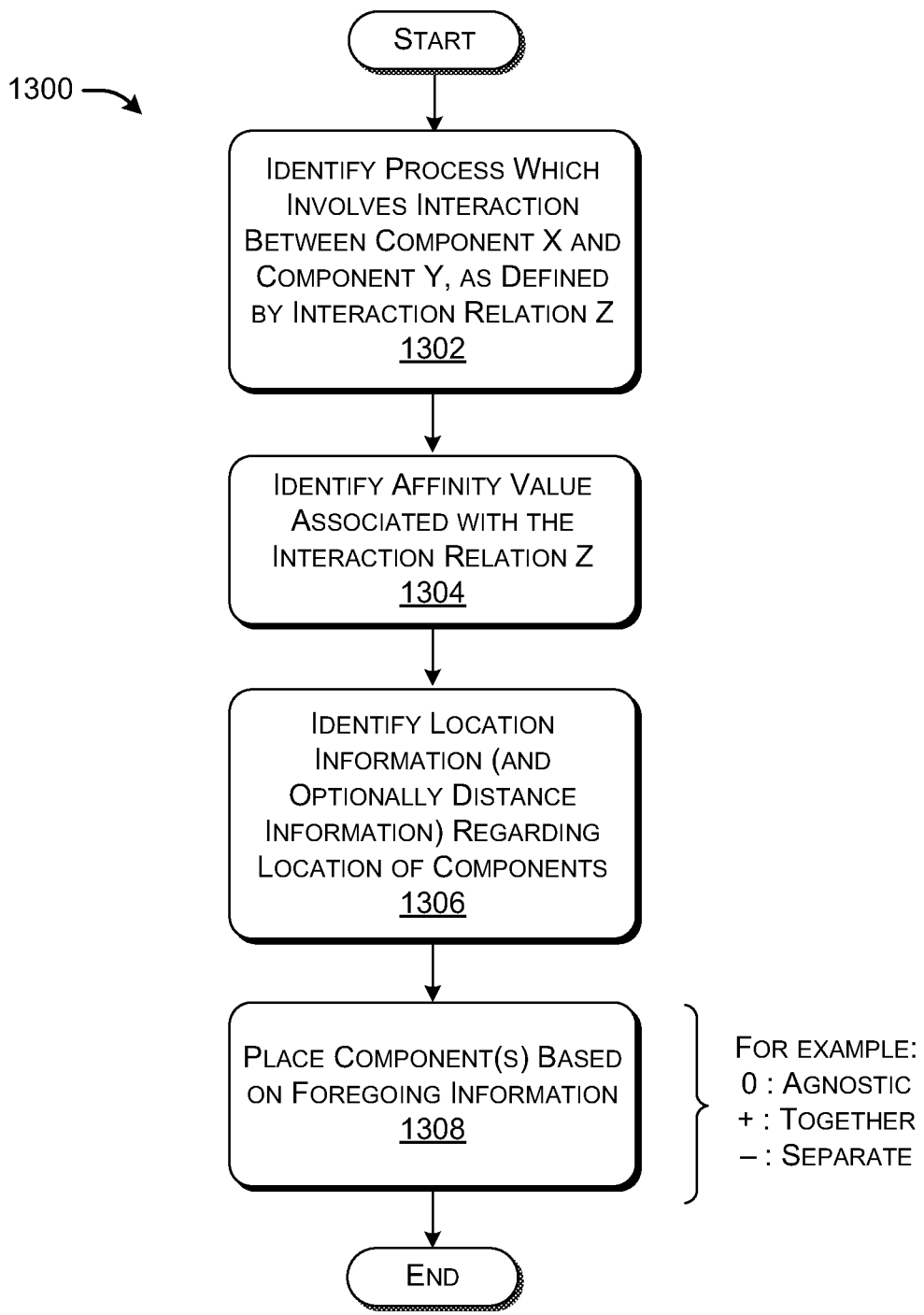
FIG. 13 shows an illustrative procedure for placing a component based on affinity values.
Figure 14:
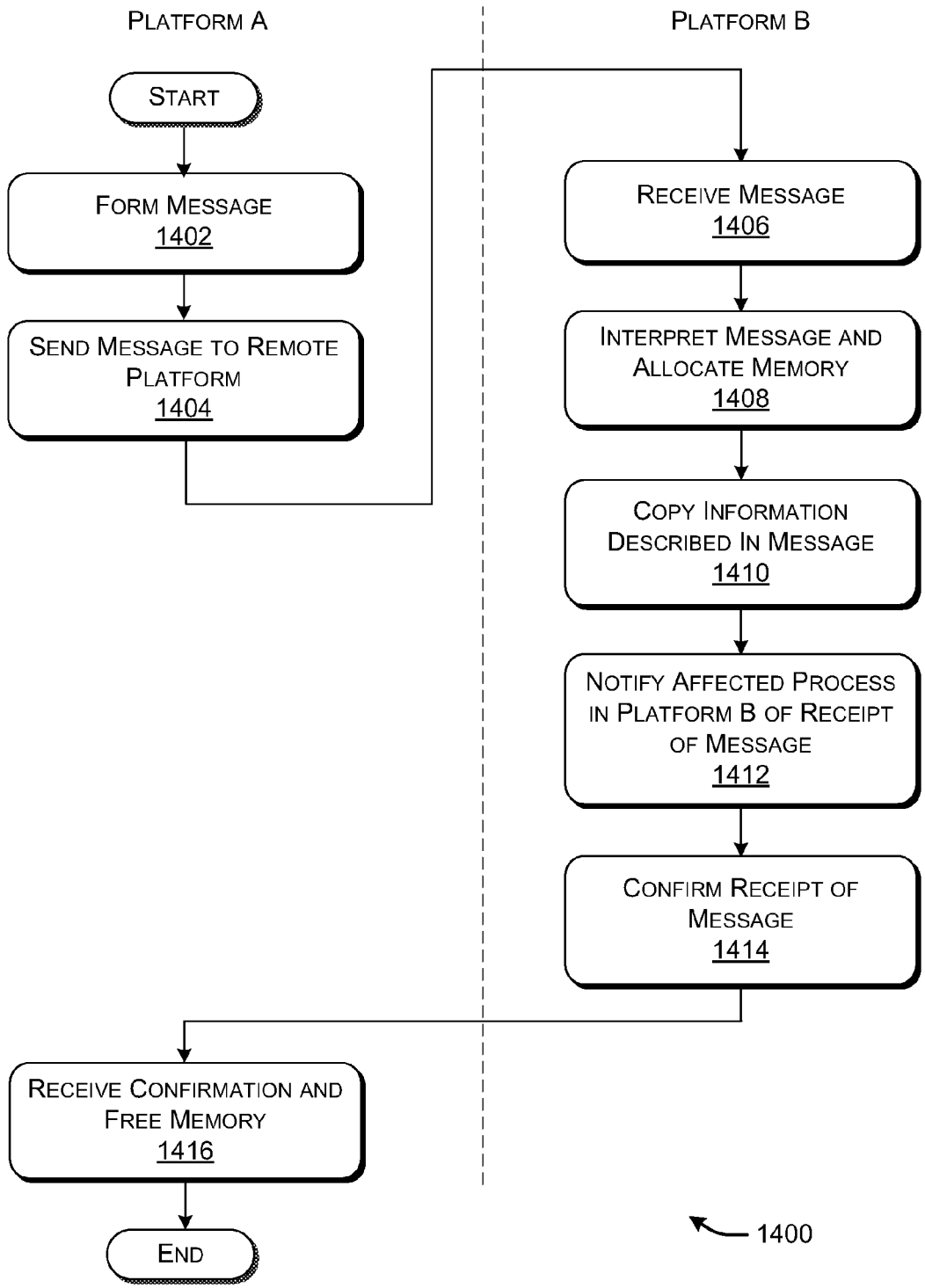
FIG. 14 shows an illustrative procedure for communicating information over a remote communication path between two platforms.

FIGS. 12-14 show procedures that explain the operation of the systems of Section A. Since the principles underlying the operation of the systems have already been described in Section A, certain operations will be addressed in summary fashion in this section.

Starting with FIG. 12, this figure shows a procedure 1200 for performing interaction between components using local communication paths and remote communication paths.

In block 1202, the operating system receives a request to perform a process, which involves the use of a component.

In block 1204, the operating system determines whether the component that is being sought is local or remote with respect to a local platform. The operating system can make this determination by using the location determination module 802 of FIG. 8.

In block 1206, the operating system branches to block 1208 to provide access to the component using a local communication path (if the component is local). Alternatively, the operating system branches to block 1210 to provide access to the component using a remote communication path (if the component is remote).

FIG. 13 shows a procedure 1300 performed by the policy manager module 1002 (of FIG. 10) for placing components among the various available platforms according to one illustrative mode of operation.

In block 1302, the policy manager module 1002 identifies a process which involves interaction between component X and component Y via an interaction relation Z. For example, this block (1302) may correspond to an interpretation of an application manifest upon running an application module.

In block 1304, the policy manager module 1002 identifies an affinity value associated with the interaction relation Z.

In block 1306, the policy manager module 1002 identifies location information that identifies the location of various components associated with the process. In addition, for a negative affinity value, the policy manager module 1002 may determine the distances between different components in a processing environment.

In block 1308, the policy manager module 1002 applies the above-described information to place the various components involved in the process. For example, this operation may involve placing an application module on one (or more) of the available platforms. An affinity value of zero indicates no preference as to the location of components in the process. A positive affinity value reflects a preference that the components involved in the process be located together. A negative affinity value reflects a preference that the components be split apart (e.g., on different platforms).

Other considerations that may govern the operation of the policy manager module 1002 were set forth in Section A.5 (above).

FIG. 14 shows a procedure 1400 for passing information between a sending entity and a receiving entity over a remote communication path, e.g., using the transfer functionality 1100 of FIG. 11. These entities may refer to two components (e.g., software-implemented components) associated with an operating system framework. Alternatively, or in addition, one or more of the entities may refer to hardware-implemented mechanisms outside the context of an operating system framework or mechanisms that implement selected functions of an operating system.

In block 1402, the sending entity forms a message. The message describes information to be sent, e.g., by specifying one or more pointers, one or more sizes, one or more offsets, etc.

In block 1404, the sending entity sends the message (the message itself or a pointer to the message) over the remote communication channel. It is also possible to pass the information itself.

In block 1406, the receiving entity receives the message.

In block 1408, the receiving entity unpacks and interprets the message. Based on the description in the message, the receiving entity allocates memory (e.g., in its own native platform) to store the information.

In block 1410, the receiving entity copies the information into the allocated memory, e.g., using memory-to-memory transfer, etc.

In block 1412, the receiving entity notifies a process that is being invoked of the receipt of the information. This process is referred to as the consuming component within the context of FIG. 11.

In block 1414, the receiving entity sends a confirmation to the sending entity to indicate that it has successfully copied the information.

In block 1416, the sending entity receives the confirmation and frees any memory that it had allocated to storing the memory object.

Figure 15:
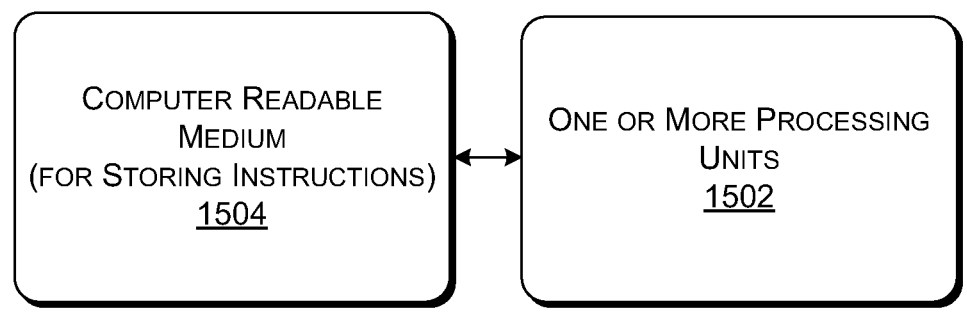
FIG. 15 shows one or more processing units for executing instructions provided on a computer readable medium.

In closing, as shown in FIG. 15, the various operations described above can be implemented, at least in part, by the execution of instructions on or more processing units 1502. These instructions can be stored on any computer readable medium 1504. The term computer readable medium also encompasses plural storage devices. The term computer readable medium also encompasses signals transmitted from a first location to a second location, e.g., via wire, cable, wireless transmission, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An operating system, comprising:
at least two instances of the operating system stored in computer readable memory and distributed among at least two different heterogeneous platforms within a computing device, the at least two different heterogeneous platforms comprising a first platform on a first substrate and a second platform on a second substrate different from the first substrate, the first platform comprising a first functionality and at least one application module configured to interact with the first platform via a first local communication path and with the second platform via a remote communication path, the second platform comprising a second functionality and at least one other application module configured to interact with the first platform via the remote communication path and with the second platform via a second local communication path, said at least two instances using single-kernel semantics, the single-kernel semantics presenting a common homogenous operating system abstraction to the at least one application module and the at least one other application module such that the first functionality and second functionality are available to the at least one application module and the at least one other application module in a manner transparent to the at least one application module, the at least one other application module, the first functionality, and the second functionality.

2. The operating system of claim 1, wherein the first platform uses a different instruction set architecture than the second platform.

3. The operating system of claim 1, wherein the first platform corresponds to a first non-uniform memory access (NUMA) domain and the second platform corresponds to a second NUMA domain.

4. The operating system of claim 1, wherein the first functionality comprises at least one of: a central processing unit (CPU) or memory, and wherein the second functionality comprises at least one of: a different CPU, different memory, a graphics processing unit (GPU), BIOS functionality, or processor cache coherency functionality.

5. The operating system of claim 1, wherein a first instance of the at least two instances of the operating system includes a monolithic kernel providing at least one operating system monolithic kernel component configured to operate within a first single address space defined by the monolithic kernel.

6. The operating system of claim 5, wherein a second instance of the at least two instances of the operating system includes:
  a microkernel providing at least one operating system microkernel component configured to operate within a second single address space defined by the microkernel; and
  one or more services providing at least one operating system service component configured to operate outside the second single address space.

7. The operating system of claim 1, wherein an instance of the at least two instances of the operating system includes:
  a microkernel providing at least one operating system microkernel component configured to operate within a single address space defined by the microkernel; and
  one or more services providing at least one operating system service component configured to operate outside the single address space.

8. A computing device, comprising:
  a first processor of a first platform executing a first operating system instance distributed on the first platform of the computing device, the first platform comprising first functionality on a first substrate; and
  a second processor of a second platform executing a second operating system instance distributed on the second platform of the computing device, the second platform being different from the first platform and comprising second functionality on a second substrate, the first operating system instance and the second operating system instance being configured to present a common operating system abstraction to an application resident on the first platform such that the first functionality of the first platform is available to the application via a local communication path and the second functionality of the second platform is available to the application via a remote communication path in a manner transparent to the application, the first functionality, and the second functionality.

9. The computing device of claim 8, wherein the first platform uses a different instruction set architecture (ISA) than the second platform.

10. The computing device of claim 8, wherein the first functionality comprises at least one of: a central processing unit (CPU) or memory, and wherein the second functionality comprises at least one of: a different CPU, different memory, a graphics processing unit (GPU), BIOS functionality, or processor cache coherency functionality.

11. The computing device of claim 8, wherein the first platform and the second platform are communicatively linked via an input-output (I/O) bus or point-to-point connection.

12. The computing device of claim 8, wherein a first instance of the at least two instances of the operating system includes a monolithic kernel providing at least one operating system monolithic kernel component configured to operate within a first single address space defined by the monolithic kernel.

13. The computing device of claim 12, wherein a second instance of the at least two instances of the operating system includes:
  a microkernel providing at least one operating system microkernel component configured to operate within a second single address space defined by the microkernel; and
  one or more services providing at least one operating system service component configured to operate outside the second single address space.

14. A system comprising:
  a first processor of a first platform on a computing device;
  a second processor on a second platform on the computing device, the second platform being communicatively linked with the first platform; and
  an operating system comprising a first operating system instance distributed on the first platform and a second operating system instance distributed on the second platform, the first operating system instance and second operating system instance being configured to present a common operating system abstraction to one or more applications resident on the first platform and configured to be implemented on the operating system such that functionality on the first platform is available to the one or more applications via a local communication path and other functionality on the second platform is available to the one or more applications via a remote communication path in a manner transparent to the one or more applications, the functionality and the other functionality.

15. The system of claim 14, wherein the first platform comprises at least one of the following on a first substrate: a central processing unit (CPU) or memory.

16. The system of claim 15, wherein the second platform comprises at least one of the following on a second substrate different from the first substrate: a different CPU, different memory, a graphics processing unit (GPU), BIOS functionality, or processor cache coherency functionality.

17. The system of claim 14, wherein the second platform is communicatively linked with the first platform via an input-output (I/O) bus.

18. The system of claim 14, wherein a first instance of the at least two instances of the operating system includes a monolithic kernel providing at least one operating system monolithic kernel component configured to operate within a first single address space defined by the monolithic kernel.

19. The system of claim 18, wherein a second instance of the at least two instances of the operating system includes:
  a microkernel providing at least one operating system microkernel component configured to operate within a second single address space defined by the microkernel; and
  one or more services providing at least one operating system service component configured to operate outside the second single address space.

20. The system of claim 14, wherein an instance of the at least two instances of the operating system includes:
a microkernel providing at least one operating system microkernel component configured to operate within a single address space defined by the microkernel; and
one or more services providing at least one operating system service component configured to operate outside the single address space.

* * * * *